United States Patent
Cho et al.

(10) Patent No.: US 9,921,926 B2
(45) Date of Patent: Mar. 20, 2018

(54) MANAGEMENT SYSTEM OF SERVER SYSTEM INCLUDING A PLURALITY OF SERVERS

(71) Applicant: Hitachi, Ltd., Tokyo (JP)

(72) Inventors: Rai Cho, Tokyo (JP); Jun Nakayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 18 days.

(21) Appl. No.: 15/025,169

(22) PCT Filed: Jan. 16, 2014

(86) PCT No.: PCT/JP2014/050674
§ 371 (c)(1),
(2) Date: Mar. 25, 2016

(87) PCT Pub. No.: WO2015/107650
PCT Pub. Date: Jul. 23, 2015

(65) Prior Publication Data
US 2016/0314050 A1    Oct. 27, 2016

(51) Int. Cl.
*G06F 11/00* (2006.01)
*G06F 11/20* (2006.01)
*G06F 11/16* (2006.01)

(52) U.S. Cl.
CPC .......... *G06F 11/2023* (2013.01); *G06F 11/16* (2013.01); *G06F 11/20* (2013.01); *G06F 11/2041* (2013.01); *G06F 11/2046* (2013.01); *G06F 2201/845* (2013.01)

(58) Field of Classification Search
USPC ........................................................ 714/4.12
See application file for complete search history.

(56) References Cited

U.S. PATENT DOCUMENTS

| | | | |
|---|---|---|---|
| 2003/0158933 A1* | 8/2003 | Smith ................ | H04L 1/22 709/224 |
| 2010/0017657 A1* | 1/2010 | Yoo .................. | G06F 11/3414 714/32 |
| 2010/0138686 A1 | 6/2010 | Arata et al. | |
| 2014/0298082 A1* | 10/2014 | Rikitake ............ | G06F 11/2215 714/4.11 |
| 2015/0339200 A1* | 11/2015 | Madduri ............ | G06F 11/2028 714/4.11 |

* cited by examiner

*Primary Examiner* — Sarai E Butler
(74) *Attorney, Agent, or Firm* — Foley & Lardner LLP

(57) ABSTRACT

For each of N active servers (N being an integer equal to or larger than 2), a management system performs, on at least one of M standby servers (M being an integer equal to or larger than 2), a full test for determining whether a failover is executable by performing a failover from the active server to the standby server, and performs, on at least one of the standby servers that is different from the standby server on which the full test is performed, a simplified test for determining whether the failover is executable without performing the failover from the active server to the standby server, the number of standby servers on which the simplified test is performed being larger than the number of standby servers on which the full test is performed.

15 Claims, 14 Drawing Sheets

Fig. 3

| 301 | 302 | 303 | 304 | 305 | 306 | 307 |
|---|---|---|---|---|---|---|
| Server ID | Management IP address | Configuration | Configuration | WWN | Operating state | Type |
| Server 1 | 192.168.11.11 | Company A, server model 1 | Chassis1,Slot1,SMP:N0 CPU:2GHz/core:4 Memory:4GB NIC:1Gbps,HBA:3Gbps | WWN-1 | Active | Active 1 |
| Server 2 | 192.168.11.12 | Company A, server model 2 | Chassis1,Slot2,SMP:N0 CPU:2GHz/core:4 Memory:4GB NIC:1Gbps,HBA:3Gbps | WWN-2 | Active | Active 2 |
| Server 3 | 192.168.11.13 | Company A, blade server model 2 | Chassis1,Slot3SMP:N0 CPU:2GHz/core:4 Memory:4GB NIC:1Gbps,HBA:3Gbps | WWN-3 | Active | Active 3 |
| . | . | . | . | . | . | . |
| Server 200 | 192.168.11.200 | Company A, blade server model 1 | Chassis(n),Slot1,SMP:N0 CPU:2GHz/core:4 Memory:4GB NIC:1Gbps,HBA:3Gbps | WWN-200 | Active | Active 200 |
| Server 201 | 192.168.11.201 | Company A, blade server model 1 | Chassis2,Slot1,SMP:N0 CPU:2GHz/core:4 Memory:4GB NIC:1Gbps,HBA:3Gbps | WWN-201 | Standby | Standby 1 |
| Server 202 | 192.168.11.202 | Company A, blade server model 1 | Chassis2,Slot2,SMP:N0 CPU:2GHz/core:4 Memory:4GB NIC:1Gbps,HBA:3Gbps | WWN-202 | Standby | Standby 2 |
| ... | ... | ... | ... | ... | ... | ... |

Server management information
211

Fig. 4

| Storage ID | Management IP address | Host group ID | WWN | Controller | Port ID | LU ID | Access permission |
|---|---|---|---|---|---|---|---|
| Storage 1 | 192.168.11.9 | Host group 1 | WWN-1 | Controller 0 | Port 1 | LU 1 | Read/Write |
| Storage 1 | 192.168.11.9 | Host group 2 | WWN-2 | Controller 0 | Port 2 | LU 2 | Read/Write |
| Storage 1 | 192.168.11.9 | Host group 3 | WWN-3 | Controller 1 | Port 3 | LU 3 | Read/Write |
| Storage 2 | 192.168.11.10 | Host group 1 | WWN-4 | Controller 0 | Port 1 | LU 5 | Read/Write |
| ... | ... | ... | ... | ... | ... | ... | ... |

Storage management information
212

Fig. 5

| Applied model | Driver version | Location |
|---|---|---|
| Company A, server model 1 | 6-2-0 | C¥mini OS |
| Company A, server model 2 | 1-2-1 | C¥mini OS |
| ... | ... | ... |

Simplified OS management information
213

Fig. 6

| Combination | | Test order | Test type | Test status | Result | Reliability | Failover priority | Failover status |
|---|---|---|---|---|---|---|---|---|
| Active server 1 | Standby server 1 | 1 | Full test | Completed | Succeeded | High | Low | OK |
| | Standby server 2 | 2 | LU reference test | Completed | Succeeded | Medium | Medium | OK |
| | Standby server 3 | 3 | LU recognition test | Completed | Succeeded | Low | High | OK |
| | Standby server 4 | 4 | LU recognition test | Completed | Succeeded | Low | High | OK |
| | Standby server 5 | 5 | LU recognition test | In process | - | - | - | - |
| Active server 2 | Standby server 1 | 5 | LU recognition test | In process | - | - | - | - |
| | Standby server 2 | 1 | Full test | Completed | Succeeded | High | Low | OK |
| | Standby server 3 | 2 | LU reference test | Completed | Succeeded | Medium | Medium | OK |
| | Standby server 4 | 3 | LU recognition test | Completed | Succeeded | Low | High | OK |
| | Standby server 5 | 4 | LU recognition test | Completed | Succeeded | Low | High | OK |
| Active server 3 | Standby server 1 | 4 | LU recognition test | Completed | Succeeded | Low | High | OK |
| | Standby server 2 | 5 | LU recognition test | In process | - | - | - | - |
| | Standby server 3 | 1 | Full test | Completed | Succeeded | High | Low | OK |
| | Standby server 4 | 2 | LU reference test | Completed | Succeeded | Medium | Medium | OK |
| | Standby server 5 | 3 | LU recognition test | Completed | Succeeded | Low | High | OK |
| Active server 4 | Standby server 1 | 3 | LU recognition test | Completed | Succeeded | Low | High | OK |
| | Standby server 2 | 4 | LU recognition test | Completed | Succeeded | Low | High | OK |
| | Standby server 3 | 5 | LU recognition test | In process | - | - | - | - |
| | Standby server 4 | 1 | Full test | Completed | Succeeded | High | Low | OK |
| | Standby server 5 | 2 | LU reference test | Completed | Succeeded | Medium | Medium | OK |
| Active server 5 | Standby server 1 | 2 | LU reference test | Completed | Succeeded | Medium | Medium | OK |
| | Standby server 2 | 3 | LU recognition test | Completed | Succeeded | Low | High | OK |
| | Standby server 3 | 4 | LU recognition test | Completed | Succeeded | Low | High | OK |
| | Standby server 4 | 5 | LU recognition test | In process | - | - | - | - |
| | Standby server 5 | 1 | Full test | Completed | Succeeded | High | Low | OK |
| Active server 6 | Standby server 1 | 6 | Full test | Not executed | - | - | - | - |
| | Standby server 2 | 7 | LU reference test | Not executed | - | - | - | - |
| | Standby server 3 | 8 | LU recognition test | Not executed | - | - | - | - |
| | Standby server 4 | 9 | LU recognition test | Not executed | - | - | - | - |
| | Standby server 5 | 10 | LU recognition test | Not executed | - | - | - | - |

Diagnosis management information
214

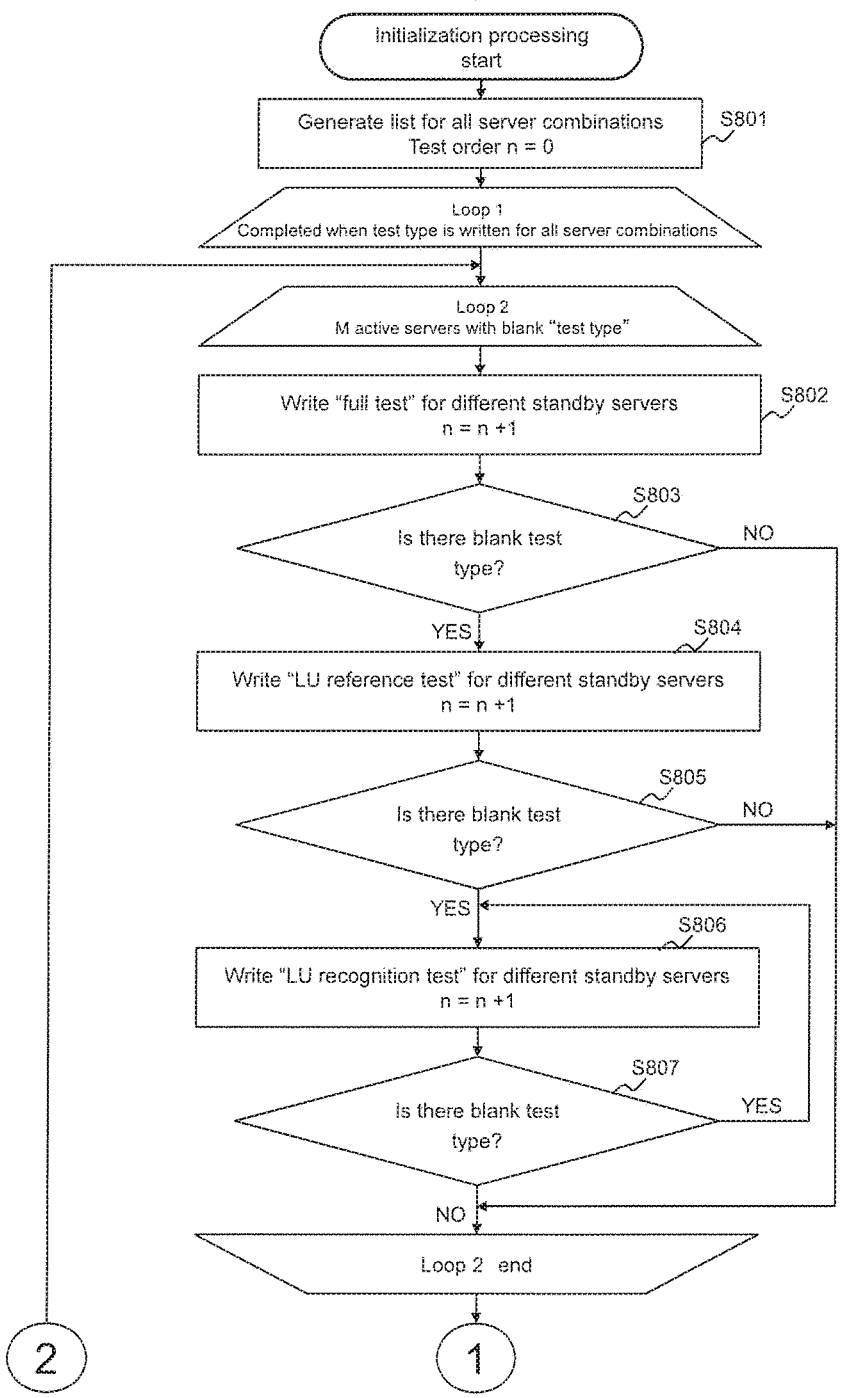

Fig. 14

Safety level summary
× : 1     ! : 1     * : 5

1401

| Safety level | Active |
|---|---|
| ! | server 1 |
|  | server 2 |
|  | server 3 |
| * | server 4 |
|  | server 5 |
| × | server6 |
| ... | ... |
| ... | ... |
| ... | ... |
| ... | ... |

1403

1402

| Standby | Test result | Reliability | Failover priority | Failover status |
|---|---|---|---|---|
| server 1 | Succeeded | Low | High | OK |
| server 2 | Succeeded | Low | High | OK |
| server 3 | Failed | - | - | NG |
| server 4 | Succeeded | High | Low | OK |
| server 5 | Succeeded | Medium | Medium | OK |

× : No failover destination
! : No failover destination with "high" as reliability
* : There is failover destination failed in test

1400

US 9,921,926 B2

MANAGEMENT SYSTEM OF SERVER SYSTEM INCLUDING A PLURALITY OF SERVERS

TECHNICAL FIELD

This invention generally relates to management of a server system including a plurality of servers.

BACKGROUND ART

A known server system includes an active server and a standby server, and performs a failover from the active server to the standby server when the active server fails. In PTL 1, a management system of a server system selects a failover strategy based on apparatus information about each of the active server and the standby server.

CITATION LIST

Patent Literature

[PTL 1]
US2010/0138686

SUMMARY OF INVENTION

Technical Problem

N+M cold standby related to the server system has been known. For the server system having the N+M cold standby, a pre-diagnosis is performed to check whether the failover can be properly performed. The diagnosis is manually performed by the user.

More specifically, the user needs to check in advance that (1) a hardware configuration of the active server (e.g., the model name, the number of ports, or the like) matches the hardware configuration of the standby server (e.g., completely match or different from each other within a tolerable range), (2) hardware of the standby server is not in failure, and (3) whether a system volume (a logical volume storing an operating system (OS)) on a storage apparatus, coupled to the active server, can be accessed. In particular, the check items (2) and (3) (e.g., checking whether the hardware of the standby server in a standby state is in failure, checking of a security setting of the storage apparatus and an FC (Fibre Channel) switch, checking of FC switch zoning, and checking whether wiring between the server and the storage apparatus is broken) are difficult to perform with a program. Thus, the user actually causes the server system to perform the failover from the active server to the standby server, to test whether the failover can be performed.

However, the test involving the actual failover from the active server to the standby server requires a long time. Thus, the number of servers largely affects the time required for diagnosing the server system.

Solution to Problem

For each of N active servers (N being an integer equal to or larger than 2), a management system performs, on at least one of M standby servers (M being an integer equal to or larger than 2), a full test for determining whether a failover is executable by performing a failover from the active server to the standby server, and performs, on at least one of the standby servers that is different from the standby server on which the full test is performed, a simplified test for determining whether the failover is executable without performing the failover from the active server to the standby server, the number of standby servers on which the simplified test is performed being larger than the number of standby servers on which the full test is performed.

Advantageous Effects of Invention

The simplified test, which is completed in a shorter time than the full test, is performed on at least one of the standby servers for each of the N active servers. The number of standby servers on which the simplified test is performed is larger than the number of standby servers on which the full test is performed. Further, the full test is also performed on at least one of the standby servers for each of the N active servers. With this configuration, reduction in reliability of the server system can be prevented, while the time required for diagnosis of the server system can be shortened.

BRIEF DESCRIPTION OF DRAWINGS

FIG. 3 illustrates a configuration of server management information.
FIG. 4 is illustrates a configuration of storage management information.
FIG. 5 illustrates a configuration of simplified OS management information.
FIG. 6 illustrates a configuration of diagnosis management information.
FIG. 8A illustrates a part of initialization processing for the diagnosis management information.
FIG. 14 illustrates an example of a pre-diagnosis result screen.

DESCRIPTION OF EMBODIMENTS

Figure 1:
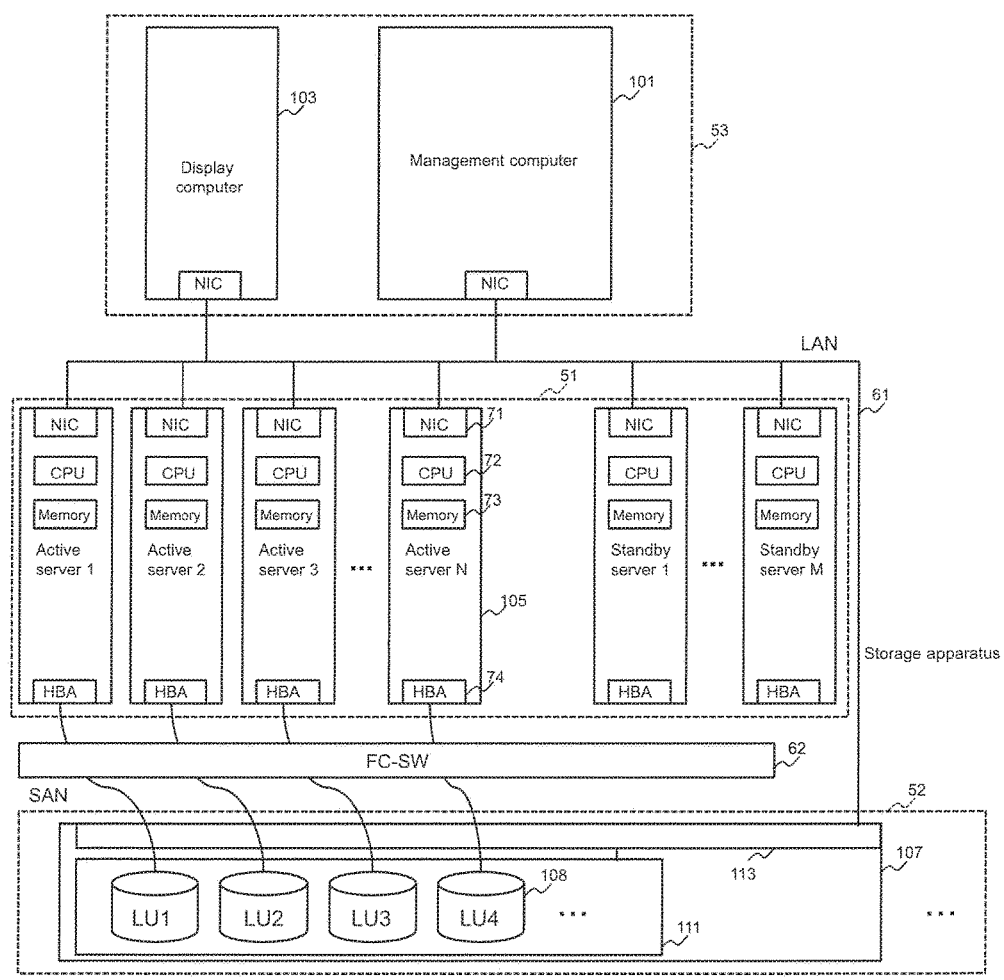
FIG. 1 illustrates a configuration of a computer system according to an embodiment.

An embodiment is described below with reference to the drawings.

In the following description, "ID" is used as identification information for elements, but other types of identification information can be used instead.

In the following description, although a "program" may be a subject of performing processing, because the program is executed by a processor performing predetermined processing using a memory and a communication port (communication control device), the processor can be a subject of performing such processing. Furthermore, processing disclosed to be performed by a program may be processing performed by a computer such as a management computer. The processor may be typically a microprocessor (e.g., CPU (Central Processing Unit)), and may include special purpose hardware that performs part of the processing, in addition to the microprocessor. The program may be installed in a computer through a program distribution server or a computer readable storage medium.

In the following description, a management computer (and a display computer) may include an input/output device. Examples of the input/output device may include, but are not limited to, a display device, a keyboard, and a pointer device. As an alternative example of the input/output device in the management computer, a serial interface or an Ethernet (registered trademark) interface may be employed, and a display computer, including the display device, the keyboard, or the pointing device, may be coupled to the interface. The management computer may transmit information for display to the display computer and receive input information from the display computer, to display the information for display on the display computer and receive an input through the display computer.

In the following description, one computer or a group of computers that display the information for display may be referred to as the management system. The management system may be a management computer that displays information on the display device of the management computer, or a combination between the management computer and the display computer. To achieve higher speed and higher reliability of management processing, a plurality of computers may execute processing that is identical or similar to that executed by the management computer. In such a case, the management system may be the plurality of computers (including the display computer, when the display computer performs the displaying). The management computer may display the information for display on a display device of the management computer, or the management computer (e.g., server) may transmit the information for display to the display computer (e.g., client) at a distant location, to "display the information for display".

In the following description, the elements of the same type may be described without being distinguished from each other by using the reference numerals of the elements, and may be described while being distinguished from each other by using identification information allocated to the elements. For example, the servers may be written as a servers 105 to be described without being distinguished from each other, and may be written as an active server 1, a standby server 1, and the like to be described while being distinguished from each other.

In the following description, a test for determining whether a failover is executable with respect to one server combination (a combination of one active server with one standby server) is referred to as a "test", and an entire test including a plurality of tests is referred to as a "diagnosis".

FIG. 1 illustrates a configuration of a computer system according to an embodiment.

The computer system includes a server system 51, a storage system 52 coupled to the server system 51, and a management system 53 coupled to the server system 51 and the storage system 52.

The server system 51 is a server system having N+M cold standby (N and M are each an integer equal to or larger than 2). More specifically, the server system 51 includes a plurality of servers 105 including N active servers and M standby servers. Generally, N>M holds true. Each of servers 105 may be what is known as a blade server that can be inserted to and pulled out from an enclosure. At least one of a plurality of the servers 105 may be a server that has a server virtualization structure (e.g., a hypervisor) and can implement a plurality of virtual servers with the server virtualization structure. Each server 105 includes: an NIC (Network Interface Card) 71 coupled to a LAN (Local Area Network) 61; an HBA (Host Bas Adapter) 74 coupled to the storage system 52 through a SAN (Storage Area Network); a memory 73; and a CPU 72 coupled to these components. The SAN may include one or more FC-SWs (Fibre Channel Switches) 62. The server 105 runs a BIOS (Basic Input/Output System) and an OS (Operating System), and executes an application program on the OS. The BIOS is firmware that controls a peripheral device (e.g., an interface device such as the HBA (Host Bus Adapter) 74) coupled to the server 105.

The storage system 52 includes one or a plurality of storage apparatuses 107. The storage system 52 (storage apparatus 107) provides a plurality of LUs (Logical Units) 108 to a plurality of the servers 105 (at least the N active servers). The LUs 108 may be referred to as logical volumes. For example, LUs 108 is the system volumes described above. The server 105 can load the OS (Operating System) from the system volume provided thereto, and execute the OS. The storage apparatus 107 may include a group of storage devices 111 and a storage controller 113 that controls I/O (Input/Output) to and from the group of storage devices 111. The group of storage devices 111 may be one or a plurality of storage devices (e.g., one or more RAIDs (Redundant Arrays of Inexpensive (Independent) Disks) group). At least one of the LUs may be an LU based on the group of storage devices 111. The storage controller 113 may include: a plurality of ports coupled to the SAN (FC-SW 62); an NIC coupled to the LAN 61; a memory; and a CPU coupled to these components.

The management system 53 includes a management computer (e.g., a server) 101 and a display computer (e.g., a client) 103. The computers 101 and 103 each include the NIC coupled to the LAN 61. For example, the management computer 101 may be a management console, and the display computer 103 may be an input/output console.

The type of communication interface device is not limited to the NIC and the HBA in FIG. 1, and may be a communication interface device corresponding to a communication network or a communication protocol. For example, each server 105 may be coupled to the storage apparatus 107 through a PCIe (PCI-Express). Each server 105 may include other types of storage devices in addition to or instead of the memory 73. In at least one of the servers 105 or at least one of the storage apparatuses 107, a processor including a CPU and a dedicated hardware circuit may be employed instead of the CPU.

Figure 2:
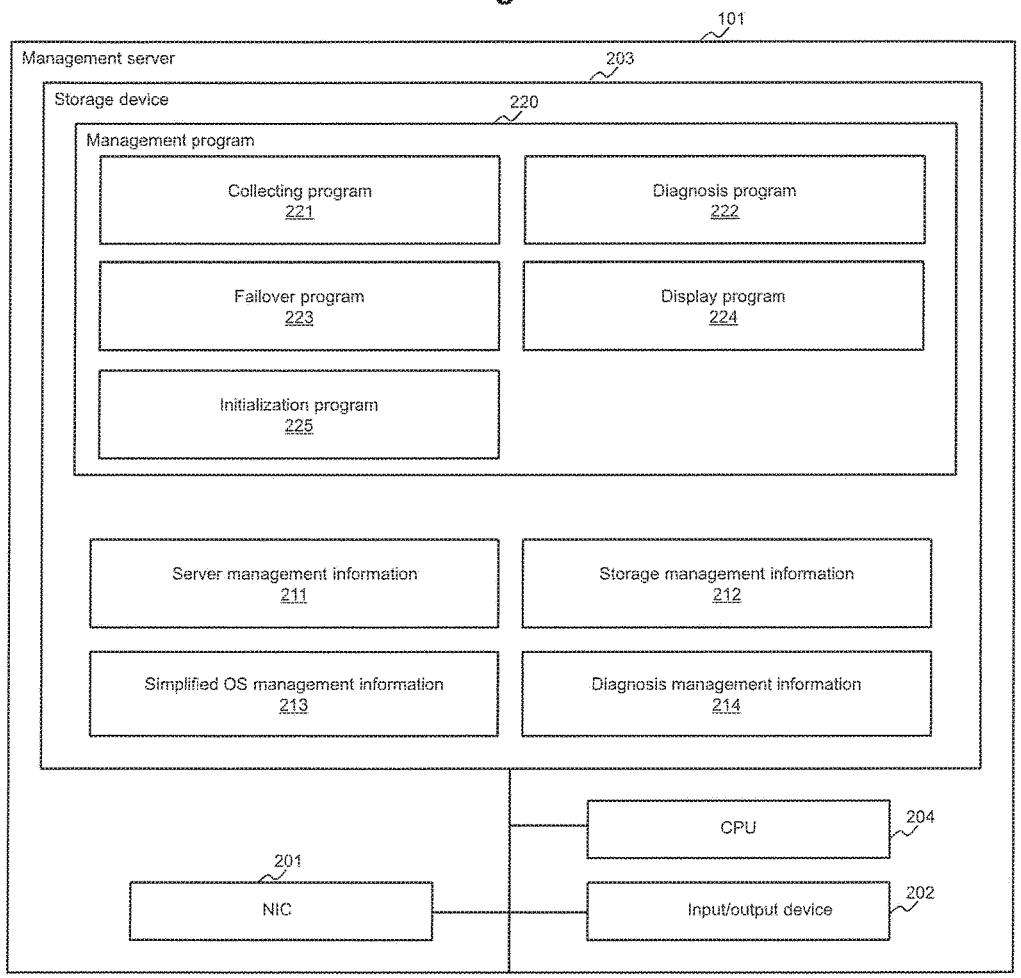
FIG. 2 illustrates a configuration of a management computer.

FIG. 2 illustrates a configuration of the management computer 101.

The management computer 101 includes an NIC 201, an input/output device 202, a storage device 203, and a CPU 204 coupled to these components. The input/output device 202 may be a man-machine interface device (e.g., a keyboard, a pointing device, or a touch panel) or may be omitted because the display computer 103 is provided. The storage device 203 may at least include a memory.

The storage device 203 stores: server management information 211 as information related to the configuration of the server system 51; storage management information 212 as information related to the configuration of the storage system 52; simplified OS management information 213 as information related to a simplified OS; and diagnosis management information 214 as information related to a pre-diagnosis. Pieces of the information 211 to 214 have a data structure in a table format, but may alternatively be information not in the table format.

The storage device 203 stores a management program 220 executed by the CPU 204. The management program 220 includes: a collecting program 221 that collects information related to the configuration from each of the server system 51 and the storage system 52; a diagnosis program 222 that executes the pre-diagnosis; a failover program 223 that executes a failover; a display program 224 that displays information for display; and an initialization program 225 that initializes the diagnosis management information 214.

FIG. 3 illustrates a configuration of the server management information 211.

The server management information 211 is established by the collecting program 221. The collecting program 221 collects information from each server 105, and establishes the server management information 211 by using the information thus collected. The server management information 211 includes a record for each server 105. Each record includes a server ID 301, a management IP address 302, a model 303, a server configuration 304, a WWN (World Wide Name) 305, an operating state 306, and a type ID 307, as information elements.

The server ID 301 indicates an ID of the server 105. The management IP address 302 indicates an IP address of the server 105. The management program 220 can access the server 105 by using the management IP address 302. The model 303 indicates a model of the server 105. The server configuration 304 indicates information related to the configuration of the server 105 such as, for example, an architecture of the CPU 204, physical positional information on the enclosure, a slot, and the like, SMP (Symmetric Multi Processing) between the servers 105, and a performance of each hardware configuration element of the server 105. The WWN 305 is a WWN for the servers 105 (the HBA 74 of the server 105). The operating state 306 indicates an operating state (for example, active or standby) of the server 105. The type ID 307 is a combination between the type of the server 105 and a serial number of each type (e.g., active 1, active 2, . . . , standby 1, standby 2, . . . ).

FIG. 4 illustrates a configuration of the storage management information 212.

The storage management information 212 is established by the collecting program 221. The collecting program 221 collects the information from each storage apparatus 107, and establishes the storage management information 212 by using the information thus collected. The storage management information 212 includes a record for each LU provided by the storage system 52. Each record includes a storage ID 401, a management IP address 402, a host group ID 403, a WWN 404, a controller 405, a port ID 406, an LU ID 407, and an access permission 408, as information elements.

The storage ID 401 indicates an ID of the storage apparatus 107 that provides the LU (logical volume). The management IP address 402 indicates an IP address of the storage apparatus 107 that provides the LU. The management program 220 can access the storage apparatus 107 by using the management IP address 402. The host group ID 403 indicates an ID of a group of hosts (servers 105) that can access the LU (port associated with the LU). The relationship between the group of hosts and the server 105 may be managed with information not shown. The WWN 404 indicates a WWN of the server 105 (the HBA 74 of the server 105). The controller 405 indicates an ID of the storage controller 113 that provides the LU. The port ID 406 indicates an ID of a port associated with the LU. The LU ID 407 indicates an ID of the LU. The access permission 408 indicates a type of access (e.g., read/write (both permitted), read (only read is permitted), or—(read/write both prohibited)) permitted to the LU. Which LU is provided to which active server can be recognized from a combination between the WWN 404 and the LU ID 407 and the server management information 211 in FIG. 3.

FIG. 5 illustrates a configuration of the simplified OS management information 213.

The simplified OS management information 213 includes a record for each simplified OS. Each record includes an applied model 501, a driver version 502, and a location 503 as information elements. The applied model 501 indicates a model of the servers 105 to which the simplified OS may be applied. The driver version 502 indicates a version of the simplified OS. The location 503 indicates a stored location (e.g., a logical path from the management program 220 to the simplified OS) of the simplified OS. The simplified OS may also be stored in a location outside the management computer 101 (e.g., the storage system 52) in addition to or instead of the management computer 101 (e.g., the storage device 203).

The simplified OS is an OS executed by the server 105. Thus, the OS executed by the server 105 in the present embodiment includes a simplified OS in addition to a normal OS (e.g., an OS executed while the server system 51 is operating). The simplified OS is an OS that is executed for a test in the pre-diagnosis, and can provide a less functions (e.g., an OS having function (e.g., a driver function) only required for the test) than the normal OS.

For example, information on a plurality of simplified OSs of different driver versions might be registered for a single server model in the simplified OS management information 213. In this case, the management program 220 may select the simplified OS of the latest driver version for the server model. Alternatively, the simplified OS management information 213 may not necessarily include the driver version, and the applied model 501 and the location 503 may directly correspond to each other. The simplified OS management information 213 may be information having any configuration as long as the simplified OS to be applied to the servers 105 can be recognized.

Figure 7:
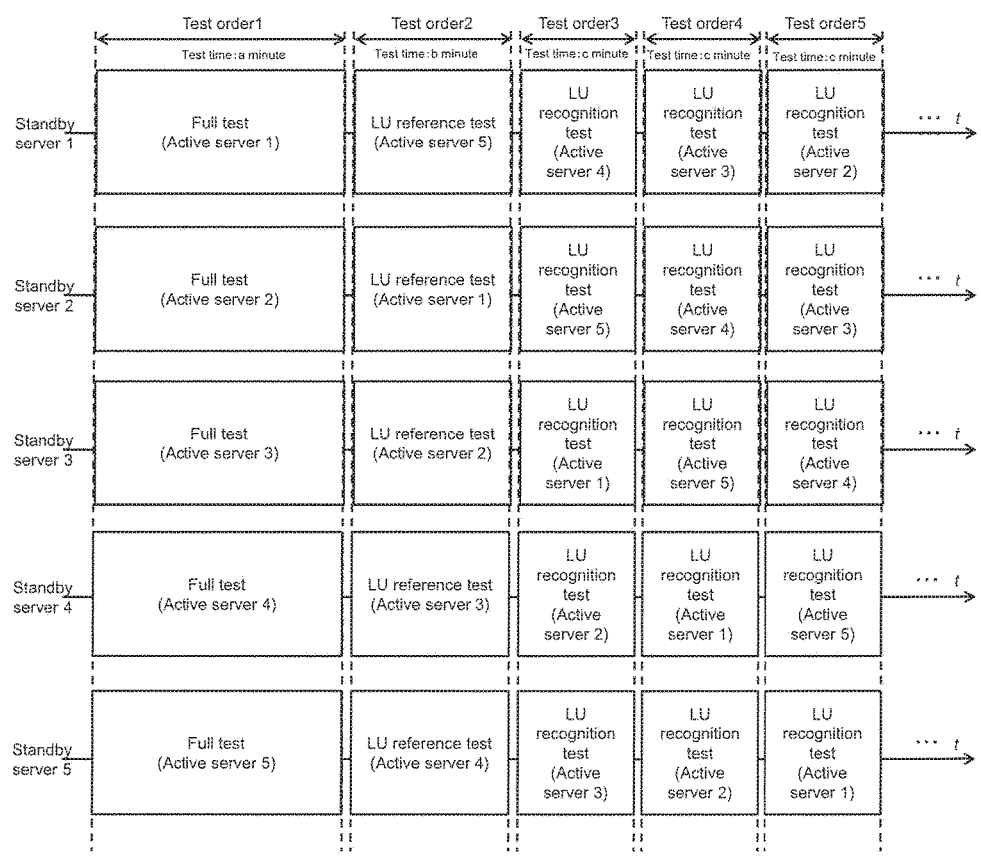
FIG. 7 illustrates a part of a pre-diagnosis performed in accordance with the diagnosis management information illustrated in FIG. 6.

FIG. 6 illustrates a configuration of the diagnosis management information 214. FIG. 7 illustrates apart of the pre-diagnosis (more specifically, a test among the active servers 1 to 5 and the standby servers 1 to 5) executed in accordance with the diagnosis management information 214 in FIG. 6. The following description is given mainly with reference to FIG. 6 and with reference to FIG. 7 as appropriate.

The diagnosis management information 214 includes a record for each server combination (combination between an active server and a standby server). Each record includes a combination 601, a test order 602, a test type 603, a test status 604, a result 605, a reliability 606, a failover priority 607, and a failover status 608, as information elements. Each active server corresponds to M standby servers (e.g., M=5), and a test for determining whether the failover can be performed is performed between the active servers and each of the M standby servers.

The combination 601 indicates a combination between the type ID 307 (e.g., active server 1) of the active server and the type ID 307 of the standby server (e.g., standby server 1). Thus, the combination 601 indicates a combination, between the active server and the standby server, on which the test is performed. The number of server combinations is N (the number of active servers)×M (the number of standby servers).

The test order 602 indicates an order in which the tests are performed. The test type 603 indicates the type of the test. The type of the test includes a full test and a simplified test in the present embodiment. The full test is a test involving failover from the active server to the standby server, that is, a test for determining whether the failover can be performed by actually attempting to perform the failover from the active server to the standby server. The simplified test is a test involving no failover from the active server to the standby server, that is, a test for determining whether the failover can be executed by performing a simple checking without actually attempting to perform the failover from the active server to the standby server. The simplified test is completed in a shorter time than the full test. The simplified test includes: a simplified test of a first type; and a simplified test of a second type that is simpler than the simplified test of the first type (completed in a shorter time than the simplified test of the first type). An LU reference test is an example of the simplified test of the first type. An LU recognition test is an example of the simplified test of the second type. The LU reference test is a test for finding out whether the standby server can recognize the LU that is the same as the LU recognized by the active server, and whether data (e.g., data that is the same as the data read by the active server) can be read from the LU. The LU recognition test is a test for finding out whether the standby server can recognize the LU that is the same as the LU recognized by the active server, and does not involve the data reading.

The test status 604 indicates the status of the test (e.g., not executed, in process, or completed). The result 605 indicates the result of the test (e.g., succeeded or failed).

The reliability 606 indicates the reliability of the test. The full test has the highest reliability (reliability: high), the LU reference test has a lower reliability than the full test (reliability: medium), and the LU recognition test has a lower reliability than the LU reference test (reliability: low).

The failover priority 607 indicates a priority of the standby server selected as a failover destination from the active server. The failover is performed for each active server, with the standby server with a higher priority more preferentially selected.

The failover status 608 indicates whether the failover can be performed. The failover status 608 is "OK" (failover can be performed) if the test has been successful, and is "NG" (failover cannot be performed) if the test has failed. A value of the failover status 608 is not necessarily "OK" even when the test result 605 is "succeeded". For example, the test result 605 is "succeeded" and the failover status 608 is "OK" if the test has been successful in an environment establishing phase (a pre-diagnosis phase before the operation starts). However, for example, when the failover is performed from a certain active server to a certain standby server in an operation phase (a phase starting during or after the pre-diagnosis), the standby server cannot be used as the failover destination for the other active servers. Thus, for this standby server, the test result 605 is "succeeded" and the failover status 608 is "NG".

In FIG. 6 and FIG. 7, the number of standby servers on which the simplified test is performed is larger than the number standby servers on which the full test is performed, for each active server, and the full test is performed between each active server and at least one of the standby servers. Thus, maintaining of the high reliability of the server system 51 and shortening of the time required for the pre-diagnosis can be both achieved.

In FIG. 6 and FIG. 7, the number standby servers on which the LU recognition test is performed is larger than the number of standby servers on which the LU reference test is performed, for each active server. Thus, the time required for the pre-diagnosis can be further shortened.

In FIG. 6 and FIG. 7, the tests of the same type are performed in parallel on M standby servers (ideally, as illustrated in FIG. 7, a plurality of tests of the same type each start at the same timing). Thus, the same order is allocated to the plurality of tests of the same type performed in parallel. More specifically, the tests of the same type are performed in parallel on the M standby servers for each of M active servers among the N active servers. Thus, the tests of the same type with the same order are associated with the M different standby servers for each of M active servers. Thus, the tests of the same type are performed in parallel on the standby servers 1 to 5 for each of the different active servers 1 to 5.

In FIG. 6 and FIG. 7, on one server combination, a single test is performed and tests of a plurality of different types are not performed. Thus, when one test is performed on one server combination, the test on the server combination is completed regardless of the level of the reliability of the test. Thus, the number of times the test is performed for each of the active servers is M that is the same as the number of the standby servers. In the present embodiment, the tests performed for M times include the full test performed once, the LU reference test performed once, and the LU recognition test performed for (M−2) times. Because the LU recognition test is one of the three types of tests requiring the shortest test time, the shortest time required for the pre-diagnosis is expected to be achieved with the breakdown described above.

In FIG. 6 and FIG. 7, the test of a type with a higher value of the reliability 606 is more preferentially performed. Thus, for each active server, the full test is first performed, then the LU reference test is performed in parallel, and finally, the LU recognition test is performed for (M−2) times. The tests may be performed in any order as long as the tests of the same type can be performed in parallel. For example, an order may be LU recognition test→full test→LU recognition test→LU reference test→LU recognition test. For each active server, a plurality of tests of the same type may be performed sequentially. The diagnosis program 222 may start the operation of the server system 51 when the full test is performed on at least one of the standby servers (e.g., standby server 1) for each of the N active servers. In such a case, the full test needs not to be performed on the other standbys (e.g., standby servers 2, 3, 4, and 5), whereby a shorter total test time can be achieved, and the operation of the server system can be started earlier.

In FIG. 6 and FIG. 7, the same standby server might be provided with different priorities in accordance with the active server. The priority is determined based on the test reliability. For example, the priority and the reliability of the test are correlated. In the present embodiment, a lower test reliability leads to a higher priority, and a higher test reliability leads to a lower priority. Thus, while the server system 51 is in operation, a standby server (e.g., a standby server other than the standby server 1) determined to be failover OK in the simplified test is preferentially selected as a failover destination from one active server (e.g., active server 1). When the fail-over to the selected standby server fails, another standby server with the same or the next highest priority is selected, and the failover to the other standby server thus selected is performed. Thus, the standby server (e.g., standby server 1) determined to be failover OK in the full test, that is, the standby server to which the failover can surely be performed is saved as long as possible. Thus, the high reliability of the server system 51 can be maintained. The reliability and the failover priority are correlated, and thus any one of the reliability and the failover priority may be omitted. The reliability may be regarded as the same as the failover priority, and the failover priority may be regarded as the same as the reliability.

Processing executed in the present embodiment is described below.

Figure 8B:
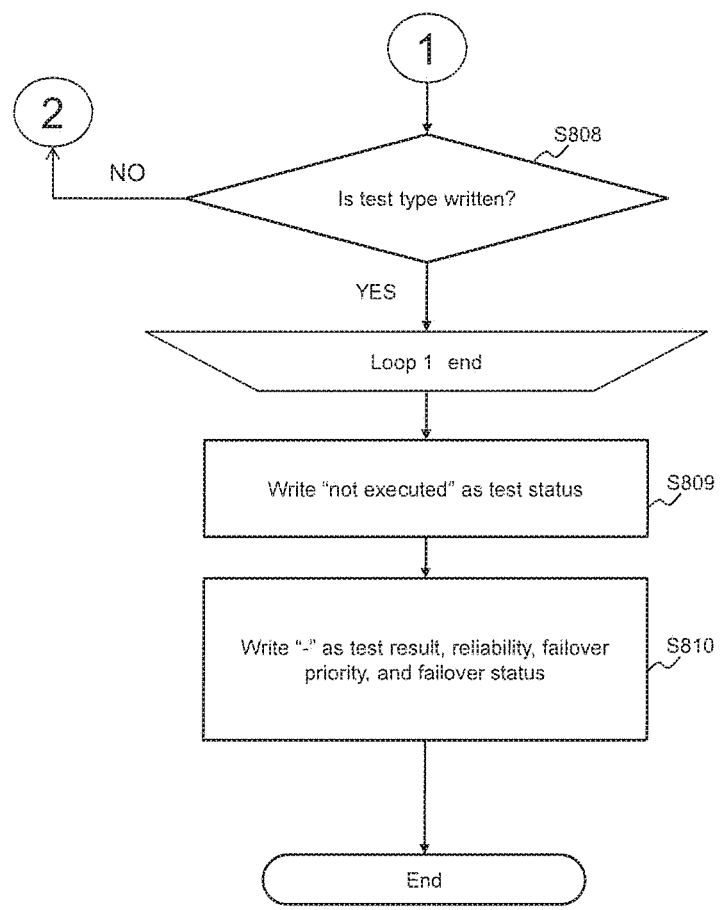
FIG. 8B illustrates the rest of the initialization processing for the diagnosis management information.

FIG. 8A illustrates a part of initialization processing for the diagnosis management information 214, and FIG. 8B illustrates the rest of the initialization processing. With the initialization processing, the test type, the test order, and the like in the diagnosis management information 214 are determined.

The initialization program 225 generates the diagnosis management information 214 including records respectively corresponding to all the combinations between the N active servers and the M standby servers, and sets n=0 (n: test order) (S801). Then, a loop 1 starts. In the present embodiment, the configuration of each of the active servers matches the configuration of each of the standby servers (completely match, or different from each other within a tolerable range). Thus, the records respectively corresponding to all the combinations between the N active servers and the M standby servers may be prepared.

In the loop 1, the initialization program 225 executes S802 to S807 on a set of the M active servers on which S802 to S807 (loop 2) has not been executed, in the N active servers. If N is not an integer multiple of M, active servers, less than M, are left over. In such a case, S802 to S807 may be executed on the remaining active servers less than M.

The initialization program 225 selects, for each of the M active servers, a standby server different from those selected for the other active servers. Then, the initialization program 225 writes "full test" as the test type 603 and n=n+1 as the test order 602 in the record corresponding to the selected standby server (S802).

When there is a server combination with a blank as the test type 603 (S803: YES), the initialization program 225 selects, for each of the M active servers, a standby server different from those selected for the other active servers. Then, the initialization program 225 writes "LU reference test" and n=n+1 respectively as the test type 603 and the test order 602 in the record corresponding to the selected standby server (S804).

When there is a server combination with a blank as the test type 603 (S805: YES), the initialization program 225 selects, for each of the M active servers, a standby server different from those selected for the other active servers. Then, the initialization program 225 writes "LU recognition test" as the test type 603 and n=n+1 as the test order 602 in the record corresponding to the selected standby server (S806). When the server combination with a blank as the test type 603 still remains (S807: YES), S806 is performed on such a server combination.

When the loop 2 is completed on the M active servers, the initialization program 225 determines whether the test type 603 has been written for all server combinations (S808). When the result of the determination in S808 is false (S808: NO), the loop 2 is executed on another set of M active servers (or the active servers less than M). When the result of the determination in S808 is true (S808: YES), the loop 1 is terminated.

The initialization program 225 writes "not executed" as the test status 604 in the records corresponding to all server combinations (S809). Furthermore, the initialization program 225 writes "-" as the result 605, the reliability 606, the failover priority 607, and the failover status 608 in the records corresponding to all server combinations (S810).

In FIG. 8A and FIG. 8B, the full test and the LU reference test are written as the test type 603 respectively with the highest and the second highest priorities. Thus, a test with higher reliability is performed with a higher priority on the active server less than M.

Figure 9:
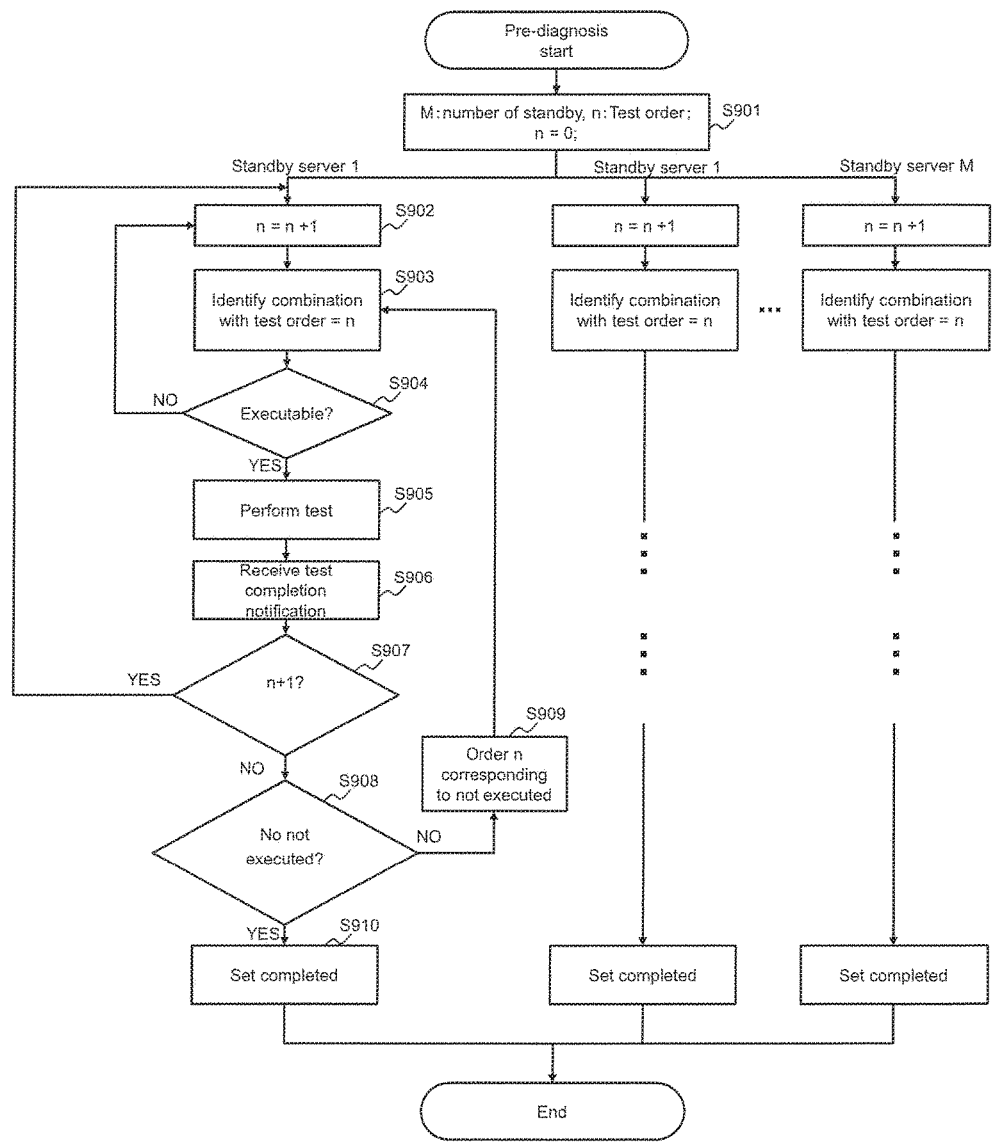
FIG. 9 illustrates a flow of the pre-diagnosis.

FIG. 9 illustrates a flow of the pre-diagnosis.

The diagnosis program 222 sets the test order: n=0 for each of the M standby servers (S901). Then, the diagnosis program 222 executes S902 to S910 on each of the M standby servers. The pre-diagnosis is terminated when S902 to S910 are executed on all of the M standby servers. Now, S902 to S910 are described below with the standby server 1 as an example.

The diagnosis program 222 sets n=n+1 (S902), and identifies a server combination, including the standby server 1 and corresponding to the test order=n, from the diagnosis management information 214 (S903).

The diagnosis program 222 determines whether a test corresponding to the test type 603 of the identified server combination is executable (S904). For example, when the failover from any one of the active servers to the standby server 1 is in process, the result of the determination in S904 is false (S904: NO). Thus, the operation of the server system 51 may be started during the pre-diagnosis (e.g., when at least the full test succeeds on all the M active servers (including the remaining active servers less than M)). All things considered, a part of the pre-diagnosis and the operation (activation) of the server system 51 may be performed in parallel.

When the result of the determination in S904 is false (S904: NO), the diagnosis program 222 executes S902 in an attempt to perform the test in the next order.

Figure 10:
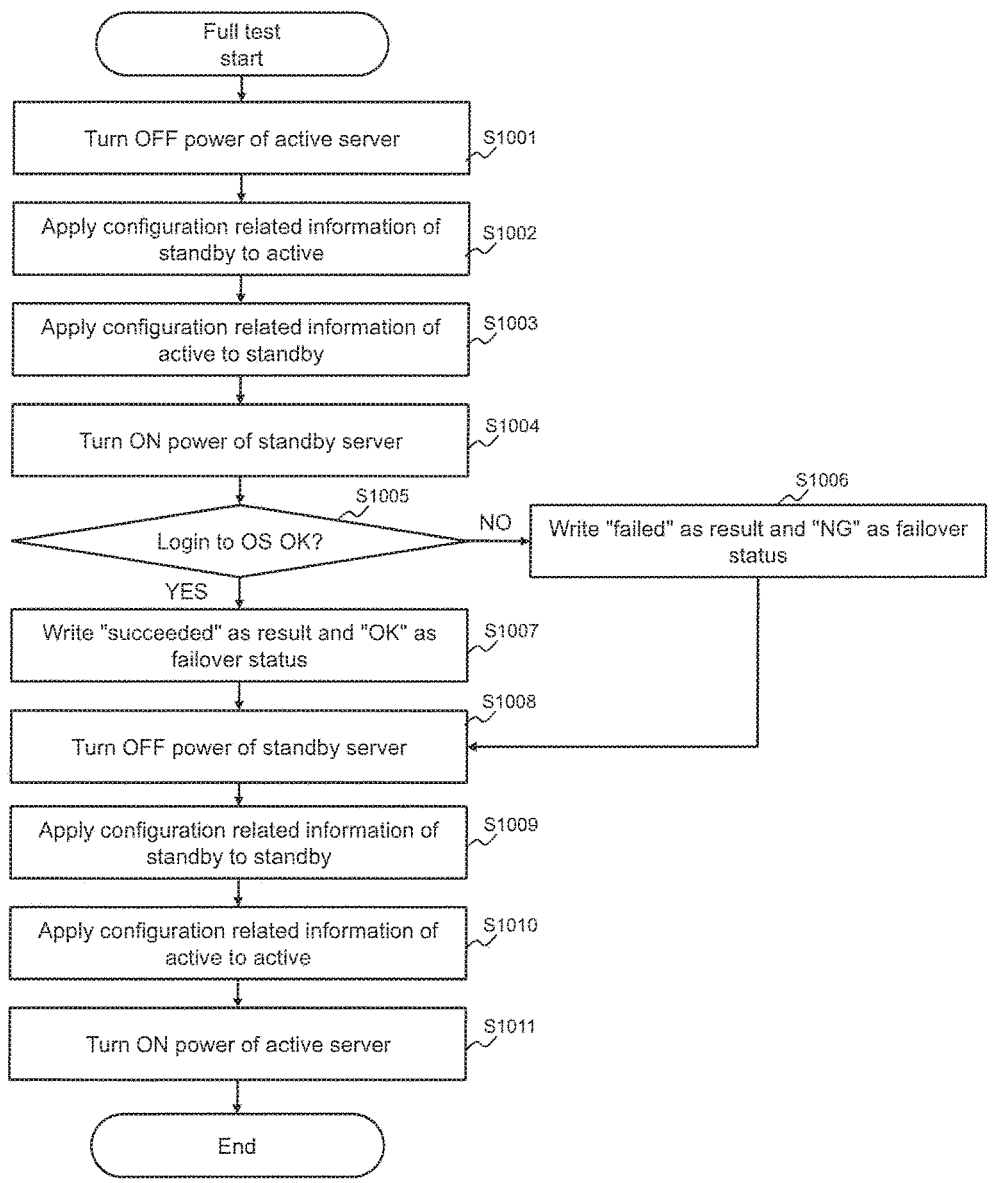
FIG. 10 illustrates a flow of a full test.
Figure 11:
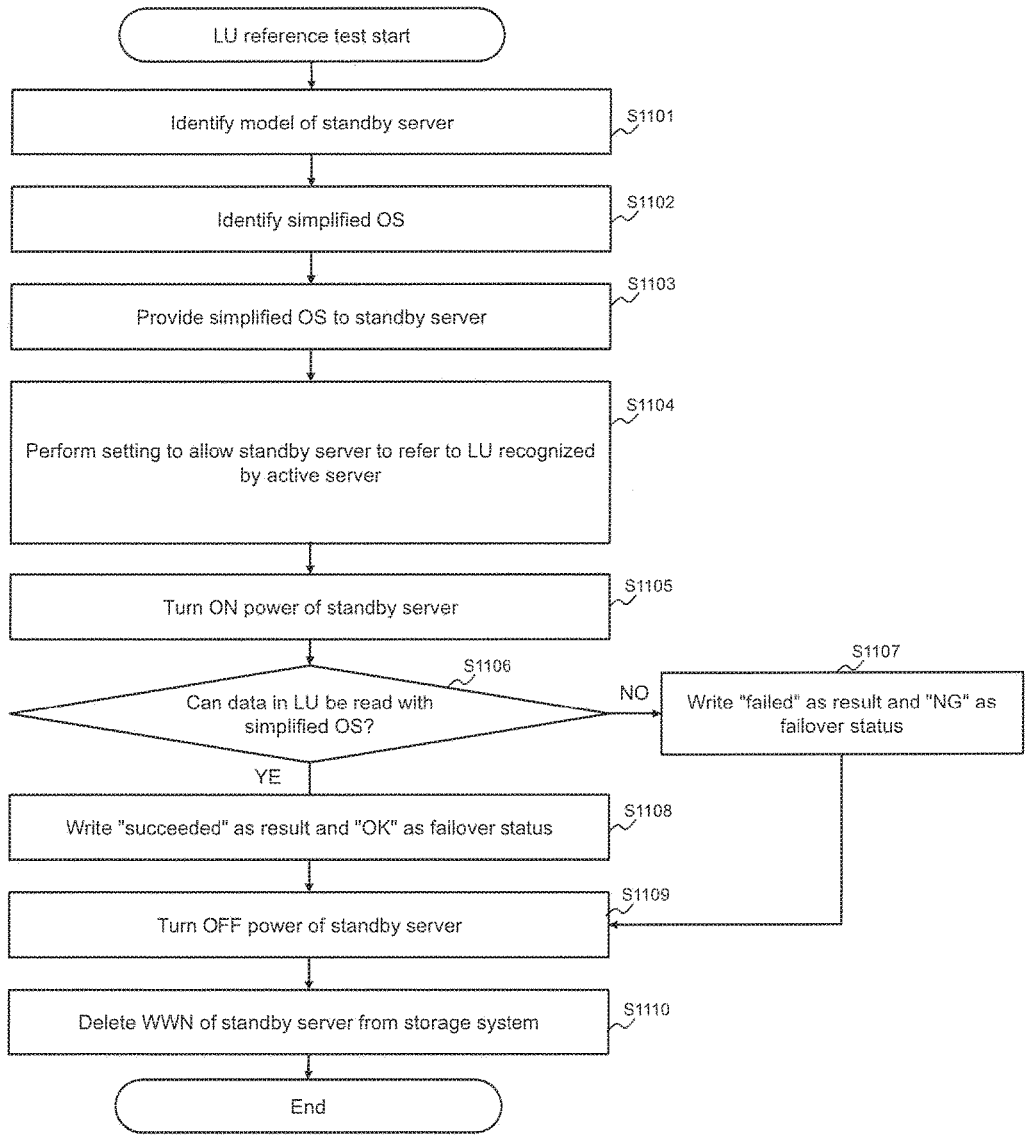
FIG. 11 illustrates a flow of an LU reference test.
Figure 12:
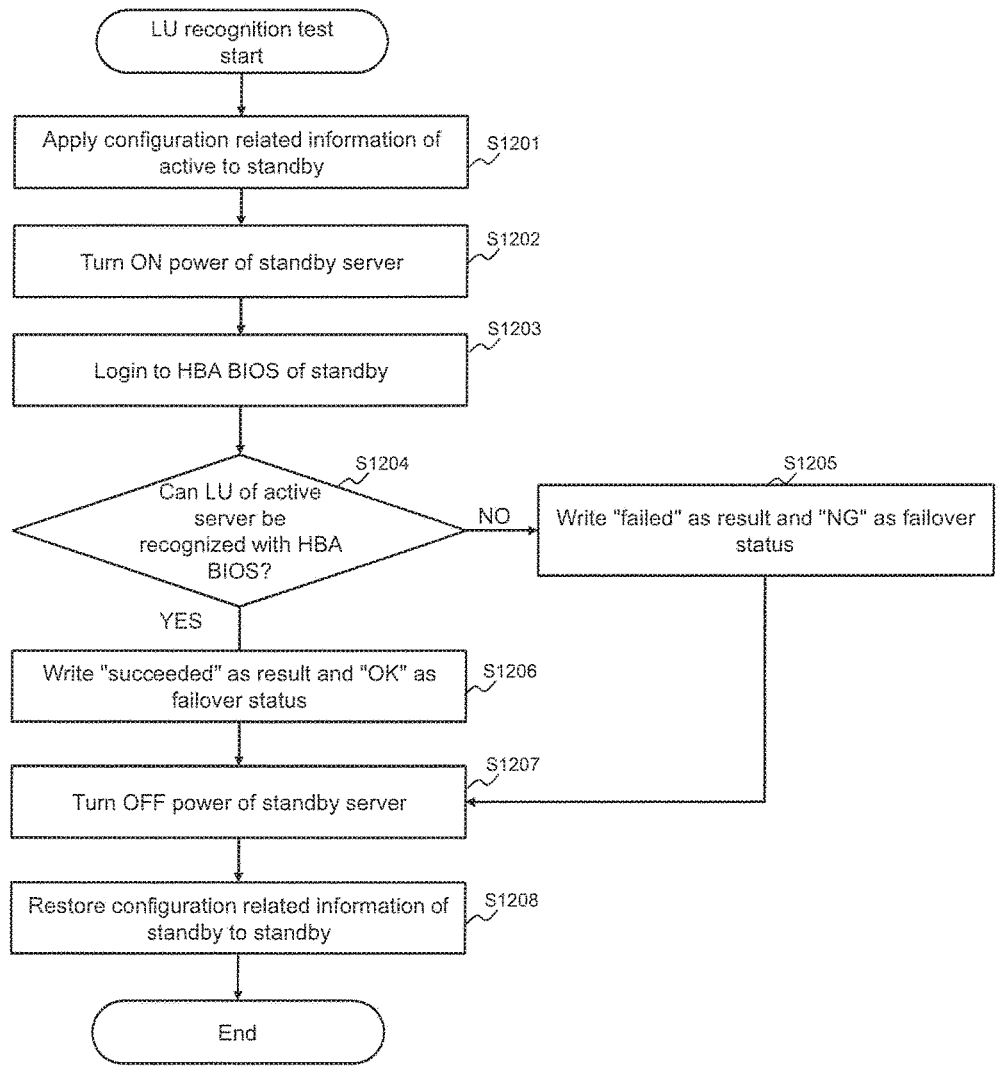
FIG. 12 illustrates a flow of an LU recognition test.

When the result of the determination in S904 is true (S904: YES), the diagnosis program 222 performs a test corresponding to the test type 603 of the server combination identified in S903 (S905). When the test type 603 is "full test", processing in FIG. 10 is executed. When the test type 603 is "LU reference test", processing in FIG. 11 is executed. When the test type 603 is "LU recognition test", processing in FIG. 12 is executed. When the test is completed, the diagnosis program 222 receives a test completion notification (S906).

The diagnosis program 222 determines whether the test order 602 is (n+1), the test status 604 is not executed, and the server combination including the standby server 1 is in the diagnosis management information 214 (S907).

When the result of the determination in S907 is true (S907: YES), the diagnosis program 222 executes S902 in an attempt to perform the test in the next order.

When the result of the determination in S907 is false (S907: NO), the diagnosis program 222 determines whether a server combination, having not executed as the test status 604 and including the standby server 1, is in the diagnosis management information 214 (S908). When the result of the determination in S908 is false (S908: NO), the diagnosis program 222 identifies the test order n of the server combination, having not executed as the test status 604 and including the standby server 1, from the diagnosis management information 214 (S909), and then executes S903.

When the result of the determination in S908 is true (S908: YES), the diagnosis program. 222 sets S902 to S910 completed for the standby server 1 (S910).

The pre-diagnosis (FIG. 9) is terminated when S902 to S910 completed is set for all of the M standby servers.

The pre-diagnosis is diagnosis processing that starts before the operation of the server system 51 starts, and the same diagnosis processing may be executed after the operation of the server system 51 has started.

FIG. 10 illustrates a flow of the full test. The description with reference to FIG. 10 is given with a server combination between the active server 1 and the standby server 1 as an example.

The diagnosis program 222 turns OFF the power of the active server 1 (S1001). Then, the diagnosis program 222 causes the standby server 1 and the active server 1 to swap the predetermined configuration related information. More specifically, the diagnosis program 222 applies the configuration related information of the standby server 1 to the active server 1 (S1002), and applies the configuration related information of the active server 1 to the standby server 1 (S1003). The configuration related information as a swapping target is information required for the standby server 1 to access an LU that can be accessed by the active server 1, and may be, for example, the WWN only, the WWN and path information (information indicating a relationship between an ID of an LU that has been recognized and an ID of a port of the storage apparatus), or the BIOS of the HBA.

The diagnosis program 222 turns ON the power of the standby server 1 (S1004). Thus, the standby server 1 starts the normal OS.

The diagnosis program 222 determines whether logging into the OS of the standby server 1 is possible after S1004 is executed and before the timeout (S1005). When the result of the determination in S1005 is false (S1005: NO), failover fails. Thus, the diagnosis program 222 writes "failed" as the result 605, and "NG" as the failover status 608 for the server combination between the active server 1 and the standby server 1 (S1006). On the other hand, when the result of the determination in S1005 is true (S1005: YES), failover succeeds. Thus, the diagnosis program 222 writes "succeeded" as the result 605, and "OK" as the failover status 608 for the server combination between the active server 1 and the standby server 1 (S1007).

The diagnosis program 222 turns OFF the power of the standby server 1 (S1008). Then, the diagnosis program 222 causes the configuration related information swapped in S1002 and S1003 to be restored. More specifically, the diagnosis program 222 causes the configuration related information of the standby server 1, applied to the active server 1 in S1002, to be restored to the standby server 1 (S1009), and the configuration related information of the active server 1, applied to the standby server 1 in S1003, to be restored to the active server 1 (S1010).

The diagnosis program 222 turns ON the active server 1 (S1011), and issues a test completion notification.

In the full test, the active server 1 is momentarily duplicated when the configuration related information of the active server 1 is applied to the standby server 1 before the configuration related information of the standby server 1 is applied to the active server 1. In the present embodiment, S1003 is executed after S1002, whereby the active server 1 can be prevented from being momentarily duplicated.

In the full test, whether the failover in which the active server 1 turns into the standby server 1 and the standby server 1 turns into the active server 1 can be performed is checked, and then a failback in which the active server 1 is restored to the original standby server 1 and the standby server 1 is restored to the original active server 1 is performed. The test is also performed between the original standby server 1 and other active servers. This ensures that the other tests are performed for appropriate server combinations. The standby server is a temporary storage, and thus the performance of a server used as the standby server may be lower than the performance of a server used as the active server. Thus, by restoring the servers, degradation of the performance of the server system 51 is expected to be prevented.

FIG. 11 illustrates a flow of the LU reference test. A description with reference to FIG. 11 is given with a server combination between the active server 1 and a standby server 2 as an example.

The diagnosis program 222 identifies the model 303 of the standby server 2 from the server management information 211 (S1101), and uses the identified model 303 to identify the simplified OS from the simplified OS management information 213 (S1102). The diagnosis program 222 provides the identified simplified OS to the standby server 2 (S1103).

The diagnosis program 222 performs a setting so that the standby server 2 becomes capable of referring to a LU recognized by the active server 1 (S1104). More specifically, for example, the diagnosis program 222 sets an ID of the LU recognized by the active server 1 (hereinafter, referred to as "target LU" in the description with reference to FIG. 11) and an ID of a port associated with the target LU, for the standby server 2, adds the WWN of the standby server 2 to a host group corresponding to the active server 1, for the storage apparatus 107, and sets read only as an access permission of the LU associated with the host group corresponding to the active server 1, for the storage apparatus 107. Thus, the standby server 2 can be prevented from writing data to the target LU. The LU recognized by the active server 1 can be identified from the LU ID 407 (refer to FIG. 4) corresponding to the WWN 404 matching the WWN 305 (refer to FIG. 3) of the active server 1.

The diagnosis program 222 turns ON the power of the standby server 2 (S1105). Thus, the standby server 2 starts the simplified OS provided in S1103.

The diagnosis program 222 determines whether the standby server 2 can read data from the target LU (the LU of the active server 1) with the simplified OS (S1106). More specifically, for example, the diagnosis program 222 determines whether data of a single byte read from the top of the target LU by the diagnosis program 222 matches data of a single byte read from the top of the target LU and transmitted to the management computer 101 by the simplified OS of the standby server 2. When the result of this determination is true, the result of the determination in S1106 may be true (S1106: YES). When the result of the determination in S1106 is true, it is confirmed that the standby server 2 can read data from the target LU. It is to be noted that the simplified OS is started instead of the normal OS to achieve a shorter test time. The data may be read from the target LU only by the simplified OS and may be not be read by the diagnosis program 222. For example, when the simplified OS successfully reads out the data from the target LU, the diagnosis program 222 receives a notification indicating that the reading has succeeded. The reception of the notification indicating that the reading has succeeded by the diagnosis program 222 may result in true as the result of the determination in S1106.

When the result of the determination in S1106 is false (S1106: NO), the diagnosis program 222 writes "failed" as the result 605 and "NG" as the write failover status 608, for the server combination between the active server 1 and the standby server 2 (S1107). On the other hand, when the result of the determination in S1106 is true (S1106: YES), the diagnosis program 222 writes "succeeded" as the result 605 and "OK" as the write failover status 608, for the server combination between the active server 1 and the standby server 2 (S1108).

The diagnosis program 222 turns OFF the power of the standby server 2 (S1109). Then, the diagnosis program 222 deletes the WWN of the standby server 2 added to the host group corresponding to the active server 1 from the storage apparatus 107 (S1110). The diagnosis program 222 issues a test completion notification.

In the LU reference test, the simplified OS is started, instead of the normal OS, to read data from the target LU. The activation of the normal OS is not ensured by the activation of the simplified OS. Still, when the data can be read from the target LU, it is confirmed that the standby server 2 is not likely to be in a physical failure, and the LU that is the same as that for the active server 1 can be accessed. Thus, a reliability that is not as high as that of the full test but is sufficiently high can be achieved. Furthermore, a shorter time required for the test can be achieved compared with the full test.

FIG. 12 illustrates a flow of the LU recognition test. A description is given with reference to FIG. 12, with a server combination between the active server 1 and a standby server 3 as an example.

The diagnosis program 222 applies the HBA BIOS of the active server 1 to the HBA of the standby server 3 (S1201). The HBA BIOS of the active server 1 includes an ID of the LU ("target LU" in the description with reference to FIG. 12) recognized by the active server 1 and the host group information (e.g., host group ID). The diagnosis program 222 turns ON the power of the standby server 3 (S1202). Thus, the HBA BIOS of the standby server 3 applied in S1201 is started. Logging into the HBA BIOS of the standby server 3 is performed (S1203). As described above, the LU recognized by the active server 1 can be identified from the LU ID 407 (refer to FIG. 4) corresponding to the WWN 404 matching the WWN 305 (refer to FIG. 3) of the active server 1. One LU can be allocated to a plurality of host groups, and the LU and the coupled host group of the active server can be identified based on the LU ID 407 and the host group ID 403 corresponding to the WWN 404 of the active server. The standby server first recognizes the host group to which the active server is coupled, and then can recognize the LU allocated to the host group.

The diagnosis program 222 determines whether the target LU can be recognized from the HBA BIOS of the standby server 3 (S1204).

When the result of the determination in S1204 is false (S1204: NO), the diagnosis program 222 writes "failed" as the result 605 and "NG" as the write failover status 608 for the server combination between the active server 1 and the standby server 3 (S1205). On the other hand, when the result of the determination in S1204 is true (S1204: YES), the diagnosis program 222 writes "succeeded" as the result 605 and "OK" as the write failover status 608 for the server combination between the active server 1 and the standby server 3 (S1206).

The diagnosis program 222 turns OFF the power of the standby server 3 (S1207). Then, the diagnosis program 222 restores the original HBA BIOS of the standby server 3 to the standby server 3 (S1208). The diagnosis program 222 issues a test completion notification.

In the LU recognition test, whether the target LU can be recognized is determined with the HBA BIOS, and the OS is not started. Thus, the active server 1 is never duplicated. In the LU recognition test, the active server 1 remains to be active.

In the LU recognition test, the standby server 3 is less likely to be in a physical failure, when the target LU can be recognized with the HBA BIOS started.

Figure 13:
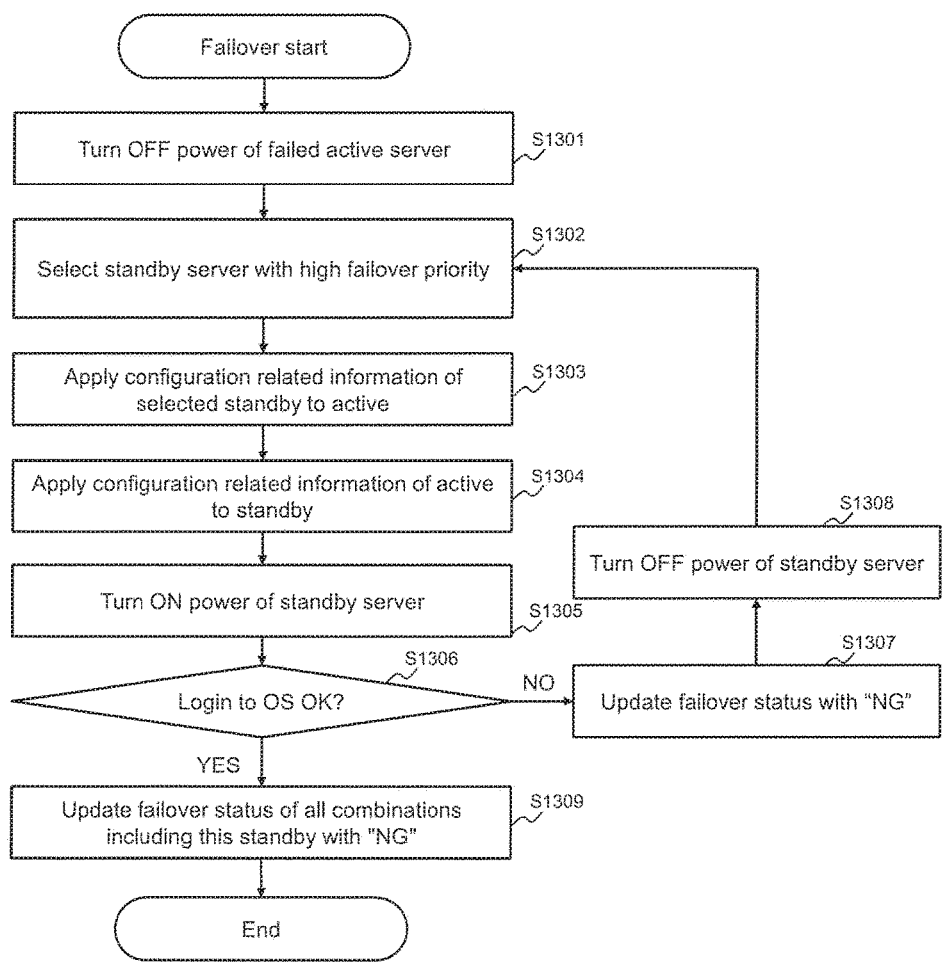
FIG. 13 illustrates a flow of a failover.

FIG. 13 illustrates a flow of the failover.

The failover program 223 turns OFF the power of the failed active server ("failed server" in the description with reference to FIG. 13) (S1301).

For the failed server, the failover program 223 selects one with the highest failover priority 607 from the standby servers with "OK" as the failover status 608 (S1302). Then, the failover program 223 causes the selected standby server ("selected server" in the description with reference to FIG. 13) and the failed server 1 to swap the predetermined configuration related information. More specifically, the failover program 223 applies the configuration related information of the selected server to the failed server (S1303), and applies the configuration related information of the failed server to the selected server (S1304). The failover program 223 turns ON the power of the selected server (S1305). Thus, the selected server starts the normal OS.

The failover program 223 determines whether logging into the OS of the selected server is possible after S1305 is executed and before the timeout (S1306). When the result of the determination in S1306 is false (S1306: NO), the failover fails. Thus, the failover program 223 writes "NG" as the failover status 608 for the server combination between the failed server and the selected server (S1307), and turns OFF the power of the selected server (S1308). Then, the failover program 223 executes S1302 again.

On the other hand, when the result of the determination in S1306 is true (S1306: YES), the failover succeeds. Thus, the failover program 223 updates the failover status 608 of all the records including the selected server with "NG" (S1309). Thus, the selected server is prevented from being selected as the failover destination from another active server.

FIG. 14 illustrates an example of a pre-diagnosis result screen.

A pre-diagnosis result screen 1400 is a GUI (Graphical User Interface) for example, and is a screen displayed on the display computer 103 by the display program 224 based on the diagnosis management information 214 after the pre-diagnosis.

The screen 1400 includes a safety level list 1401 indicating a safety level of each active server. The safety level includes: a first level (safe) indicating the safest state; a second level (there is a standby server with "failed" as the result 605) as a lower safety level than the first level; a third level (there is no standby server with "high" as the reliability 606) as a lower safety level than the second level; and a fourth level (there is no standby server as the failover destination) as a safety level lower than the third level. For the active server corresponding to two or more levels, the lowest one of the safety levels is applied. The safety level list 1401 is displayed in such a manner that a corresponding safety level is displayed for each active server. More specifically, nothing is displayed for the first level, a mark "*" is displayed for the second level, a mark "!" is displayed for the third level, and a mark "x" is displayed for the fourth level. The user can recognize the safety level from the perspective of the active server from the safety level list 1401.

The display program 224 can display a detail of each active server on the safety level list 1401. For example, the user (typically an administrator) of the display computer 103 selects an active server from the safety level list 1401 and performs an operation to check the detail of the selected active server. The display program 224 that has detected the operation displays a detailed list 1402 of the selected active server on the same screen 1400 (or in a separate screen with a popup and the like) based on the diagnosis management information 214. The detailed list 1402 includes the result 605, the reliability 606, the failover priority 607, and the failover status 608 for each of the M standby servers corresponding to the selected active server. The detailed list 1402 illustrated in FIG. 14 is a detailed list for the active server 4 with the second level as the safety level, and thus the M standby servers in the detailed list include the standby server 3 with "failed" as the result. The detailed list 1402 is displayed for a desired active server (information is displayed in a drill down manner). Thus, the user can recognize in detail the reason why the safety level is set for the desired active server. The standby server may have at least one of the result 605, the reliability 606, the failover priority 607, and the failover status 608 differing among the different active servers.

The screen 1400 further includes a safety level summary 1403. The safety level summary 1403 indicates a summary of the safety level list 1401. More specifically, the safety level summary 1403 indicates the number of the active servers corresponding the fourth level (the number of the marks "x"), the number of the active servers corresponding to the third level (the number of the marks "!"), and the number of active servers corresponding to the second level (the number of the marks "*"). Each of the numbers is calculated by the display program 224. With the safety level summary 1403, the user can quickly recognize the summary of the safety level (whether there is an active server with no failover destination, the number of such active servers, and the like) of the server system 51 from the perspective of the active server.

The present invention is not limited to one embodiment described above. For example, in the embodiment, information swapped or set in various tests is information related to communications based on an FC (Fibre Channel) protocol. When communications based on a protocol (e.g., PCI-Express protocol) different from the FC protocol are performed between the server system 51 and the storage system 52, the information related to the different protocol is swapped or set in various tests.

REFERENCE SIGNS LIST

101 Management computer

The invention claimed is:

1. A management system comprising:
an interface device coupled to a server system including N active servers (N being an integer equal to or larger than 2) and M standby servers (M being an integer equal to or larger than 2), and a storage system that provides a plurality of LUs (Logical Units) to the N active servers; and
a processor coupled to the interface device and a storage device,
the storage device being configured to store server management information including information indicating for each server whether the server is an active server or a standby server,
the processor being configured to determine a plurality of server combinations based on the server management information,
each of the server combinations being a combination between any one of the N active servers and any one of the M standby servers,
the processor being configured to execute diagnosis processing for performing a test to determine whether a failover is executable for each of the plurality of server combinations,
the test being a full test for determining whether the failover is executable by performing a failover from the active server to the standby server or a simplified test for determining whether the failover is executable without performing the failover from the active server to the standby server, and
in the diagnosis processing, the processor being configured to perform, for each of the N active servers, the full test on at least one of the standby servers, and the simplified test on at least one of the standby servers that is different from the standby server on which the full test is performed, the number of standby servers on which the simplified test is performed being larger than the number of standby servers on which the full test is performed.

2. The management system according to claim 1, wherein the processor is configured to perform tests of the same type in parallel on M of the N active servers, with respect to the M standby servers.

3. The management system according to claim 1, wherein when any one of the N active servers fails, the processor is configured to preferentially select, as a failover destination of a failed server that is an active server that has failed, a standby server on which the simplified test has succeeded among a plurality of standby servers associated with the failed server.

4. The management system according to claim 1, wherein each time the test is performed on the M standby servers, the processor is configured to determine whether the test is executable on the standby servers, and perform the test on the standby server for which a result of the determination is true.

5. The management system according to claim 1, wherein
at least one simplified test is an LU reference test that is a test including determining whether the standby server is able to read data from an LU recognized by the active server, and
in the LU reference test, for the storage system, the processor is configured to permit a standby server, in a server combination on which the LU reference test is executed, to only read an LU recognized by the active server in the server combination on which the LU reference test is performed.

6. The management system according to claim 1, wherein:
the storage device is configured to store diagnosis management information,
the diagnosis management information includes a test result for each of the plurality of server combinations, and
the processor is configured to:
display first information indicating an active server for which, among the standby servers associated therewith, the number of standby servers with a failed test result is equal to or larger than a predetermined number, based on the diagnosis management information,
receive selection of the active server in the first information, and
further display second information indicating, for the selected active server, a test result for each standby server on which the test is performed, based on the diagnosis management information.

7. The management system according to claim 1, wherein:
the storage device is configured to store diagnosis management information,
the diagnosis management information includes a test result for each of the plurality of server combinations, and
the processor is configured to display information indicating an active server associated with standby servers that have all failed in the full test, based on the diagnosis management information.

8. The management system according to claim 1, wherein:
the storage device is configured to store diagnosis management information,
the diagnosis management information includes a test result for each of the plurality of server combinations, and
the processor is configured to display summary information that is information including the number of active servers for which the number of standby servers with a failed test result is equal to or larger than a predetermined number, based on the diagnosis management information.

9. The management system according to claim 4, wherein:
when the full test is performed on at least one of the standby servers for each of the N active servers, the processor is configured to start the server system even when the diagnosis processing is in process, and preform rest of the diagnosis processing after the server system is started, and
the processor is configured to perform the full test before the simplified test for each of the N active servers.

10. The management system according to claim 1, wherein in the full test, the processor is configured to perform the failover from the active server to the standby server, and then perform a failback from the standby server to the active server.

11. The management system according to claim 1, wherein there are, as the simplified tests, a first simplified test that has a lower reliability than the full test but is completed in a shorter time than the full test and a second simplified test that has a lower reliability than the first simplified test but is completed in a shorter time than the first test.

12. The management system according to claim 11, wherein, for each of the N active servers, the number of standby servers on which the first simplified test is performed is larger than the number of standby servers on which the full test is performed, and the number of standby servers on which the second simplified test is performed is larger than the number of standby servers on which the first simplified test is performed.

13. The management system according to claim 11, wherein when any one of the N active servers fails, the processor is configured to preferentially select, as a failover destination of a failed server that is an active server that has failed, a standby server with a lowest reliability for a test that has succeeded among a plurality of standby servers associated with the failed server.

14. The management system according to claim 1, wherein:
the first simplified test is an LU reference test that is a test including determining whether the standby server is able to read data from an LU recognized by the active server, and
the second simplified test is an LU recognition test that is a test including determining whether the standby server is able to recognize the LU recognized by the active server, and not including determining whether the standby server is able to read data from the LU recognized by the active server.

15. A non-transitory computer-readable medium having a computer program stored therein, the computer program when executed by a processor of a computer that is coupled to a server system including N active servers (N being an integer equal to or larger than 2) and M standby servers (M being an integer equal to or larger than 2), and a storage system that provides a plurality of LUs (Logical Units) to the N active servers, causing the processor to perform operations comprising:
performing, on at least one of the standby servers for each of the N active servers, a full test for determining whether a failover is executable by performing a failover from the active server to the standby server; and
performing, on at least one of the standby servers for each of the N active servers, the standby servers being different from the standby server on which the full test is performed, a simplified test for determining whether the failover is executable without performing the failover from the active server to the standby server, the number of standby servers on which the simplified test is performed being larger than the number of standby servers on which the full test is performed.

* * * * *